United States Patent [19]
Hashimoto et al.

[11] Patent Number: 5,893,114
[45] Date of Patent: Apr. 6, 1999

[54] DOCUMENT INFORMATION COLLECTION METHOD AND DOCUMENT INFORMATION COLLECTION APPARATUS

[75] Inventors: Tetsuya Hashimoto, Tokyo; Yoshiki Matsuda; Mitsunori Satomi, both of Yokohama, all of Japan

[73] Assignee: Hitachi Ltd., Tokyo, Japan

[21] Appl. No.: 749,944

[22] Filed: Nov. 14, 1996

[30] Foreign Application Priority Data

Nov. 29, 1995 [JP] Japan ................................. 7-310324

[51] Int. Cl.[6] .................................................. G06F 17/30
[52] U.S. Cl. .................... 707/200; 707/500; 395/200.13
[58] Field of Search ................ 395/200.13; 345/329; 707/1, 100, 101, 102, 103, 104; 705/7, 9, 500

[56] References Cited

U.S. PATENT DOCUMENTS

| 5,142,678 | 8/1992 | MacPhail ................................ 707/500 |
| 5,280,609 | 1/1994 | MacPhail ................................ 707/1 |
| 5,517,622 | 5/1996 | Ivanoff et al. ..................... 395/200.13 |
| 5,649,192 | 7/1997 | Stucky .................................... 707/103 |
| 5,671,428 | 9/1997 | Muranaga et al. ...................... 345/329 |

OTHER PUBLICATIONS

"Outlook of Next-generation Information Distribution System", Richard Maron Stein, Nikkei Byte, Nov. 1991, pp. 320–331.

*Primary Examiner*—Thomas G. Black
*Assistant Examiner*—Ruay Lian Ho
*Attorney, Agent, or Firm*—Antonelli, Terry, Stout & Kraus, LLP

[57] ABSTRACT

Method and apparatus for automatically storing a referred electronic document in a database and notifying new information to a user. In response to a request issued from a document display control unit 106, a request relay unit 108 acquires a document from a document information management unit 113 and stores it in a document database 117. When a document which matches an interested item 112 is stored, an information monitor unit 111 notifies it to the user.

20 Claims, 14 Drawing Sheets

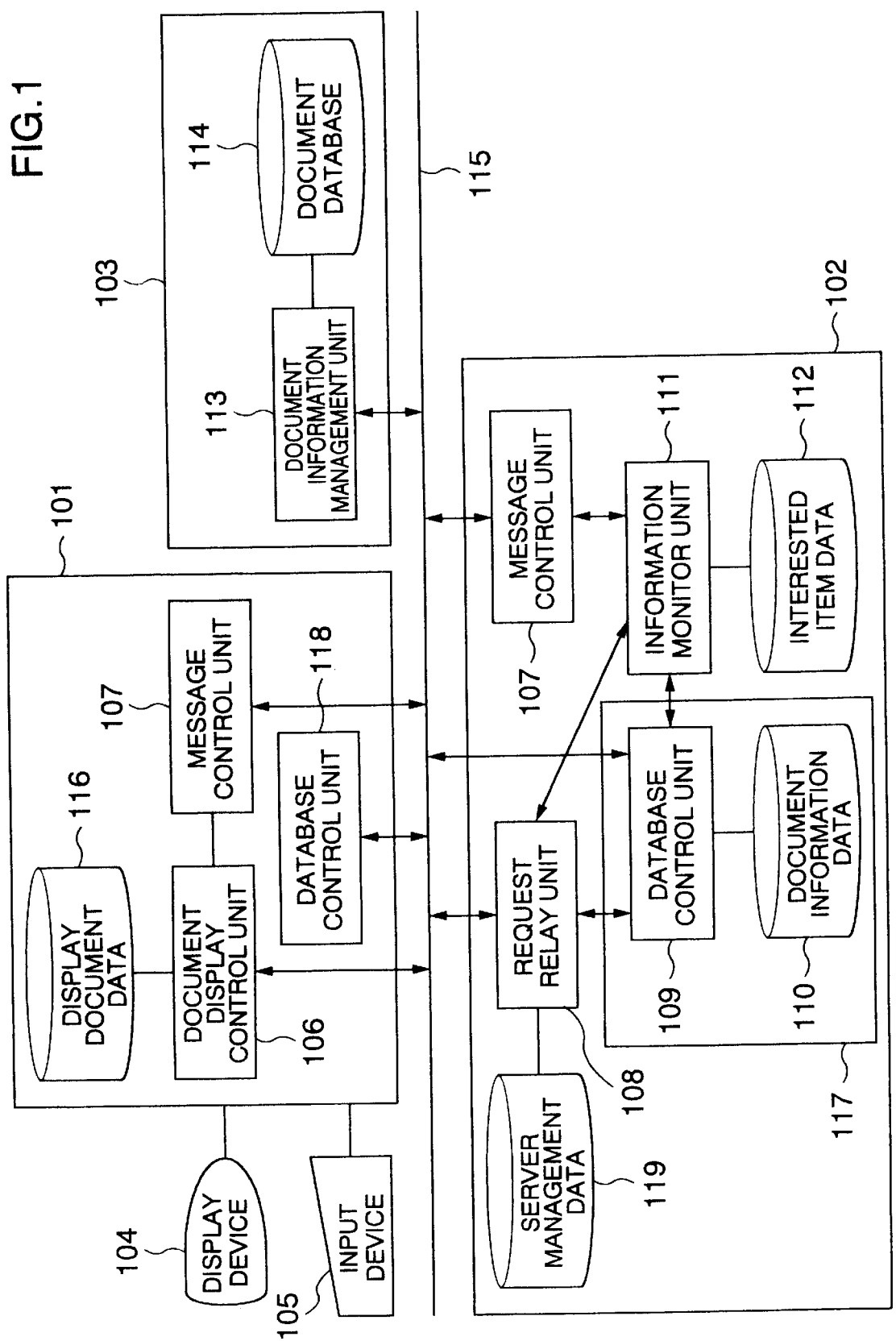

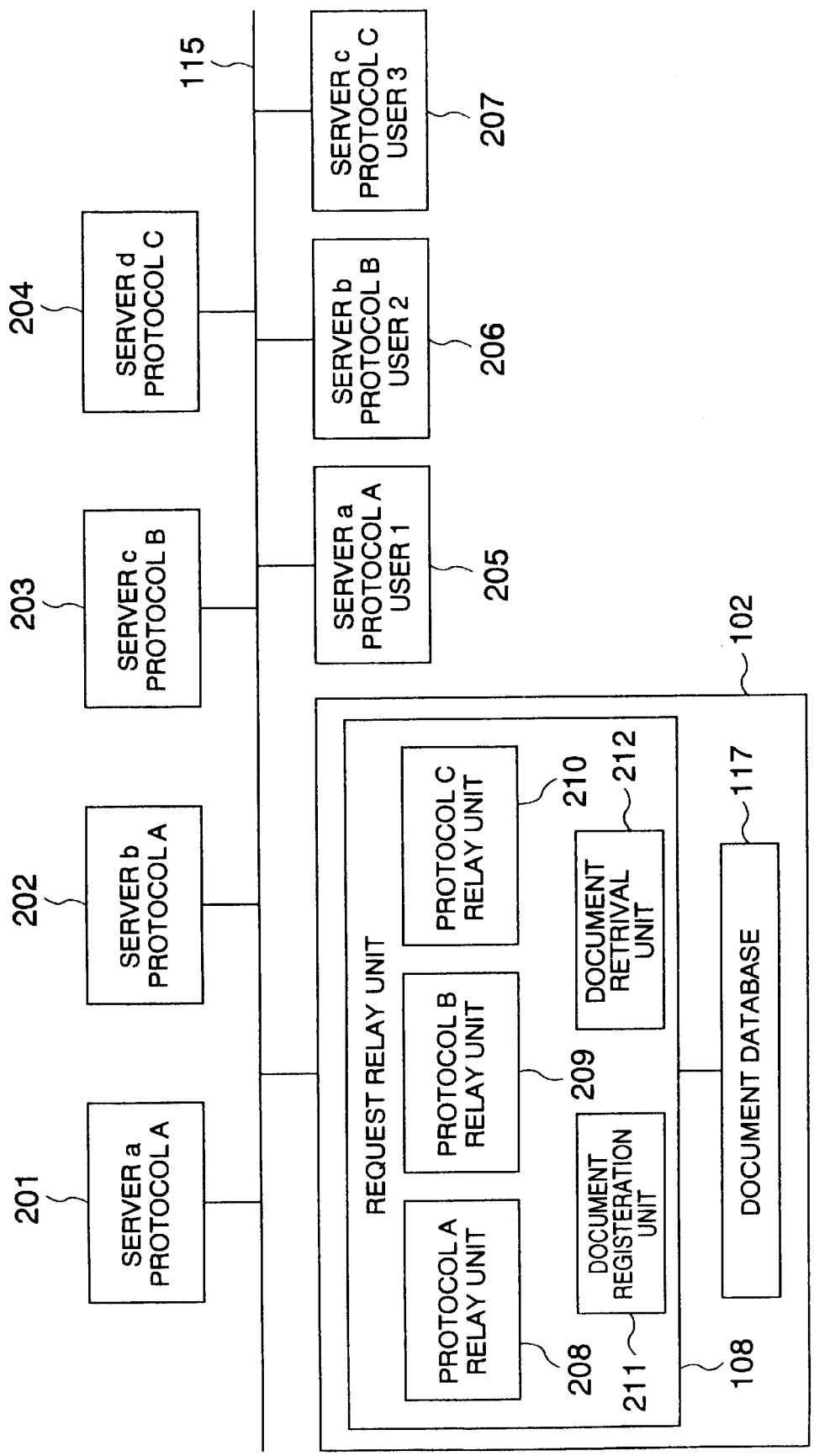

| NUMBER OF BYTES | ITEM LIST SELECT DESIRED ITEM ITEM 1 ITEM 2 ITEM 3 | | |
|---|---|---|---|
| ITEM 1 | 19 | 21 | ○ SERVER | DOCUMENT ID 5 | ENTIRE DOCUMENT |
| ITEM 2 | 22 | 24 | △ SERVER | DOCUMENT ID 10 | ENTIRE DOCUMENT |
| ITEM 3 | 25 | 27 | ○ SERVER | DOCUMENT ID 7 | 200-300 |

| ID | PROTOCOL | SERVER NAME | LOCATION | EFFECTIVE PERIOD | ADDITIONAL INFORMATION |
|---|---|---|---|---|---|
| 1 | PROTOCOL A | ○ SERVER | address1 | 0 | LAST ACCESS TIME x |
| 2 | PROTOCOL A | △ SERVER | address2 | 3 | LAST ACCESS TIME y |
| 3 | PROTOCOL A | × SERVER | address3 | 10 | LAST ACCESS TIME z |
| 4 | PROTOCOL B | ○○ SERVER | address1 | -1 | user3 |
| 5 | PROTOCOL C | — | address4 | 5 | — |

| 110 | | | | | | |
|---|---|---|---|---|---|---|
| ID (501) | DOCUMENT MANAGEMANT SERVER ID (502) | DOCUMENT ID (503) | USER (504) | DATA (505) | ATTRIBUTES 1···N (506) | TEXT (507) |
| 1 (510) | 1 | 100 | user1 | xxx | ··· | NEW PRODUCT OF xxx COMPUTER |
| 2 (511) | 4 | 300 | user2 | yyy | ··· | SALES OF CARS |
| 3 (512) | 5 | doc1 | user3 | zzz | ··· | LIST OF COMPUTER RELATED NEW PRODUCTS |
| ··· | | | | | | |

FIG.6

| 112 | | | | | | | |
|---|---|---|---|---|---|---|---|
| ID (601) | EXECUTION DATE (602) | NOTIFY MEANS (603) | ADDRESS (604) | FREQUENCY (605) | NOTIFICATION FORMAT (606) | CONDITION (607) | OBJECT (608) |
| 1 (610) | 95.7.25 | MAIL | user1 | MONTHLY | TEXT | COMPUTERS & NEW PRODUCTS | DOCUMENT |
| 2 (611) | 95.8.1 | MAIL | user2 | DAILY | FORMAT A | COMPUTERS & NEW PRODUCTS | SERVER |
| 3 (612) | 95.8.1 | MAIL | user1 | DAILY | TEXT | CARS | DOCUMENT |
| 4 (613) | 95.7.28 | FILE | name | WEEKLY | FORMAT B | AUDIO EQUIPMENT | DOCUMENT |

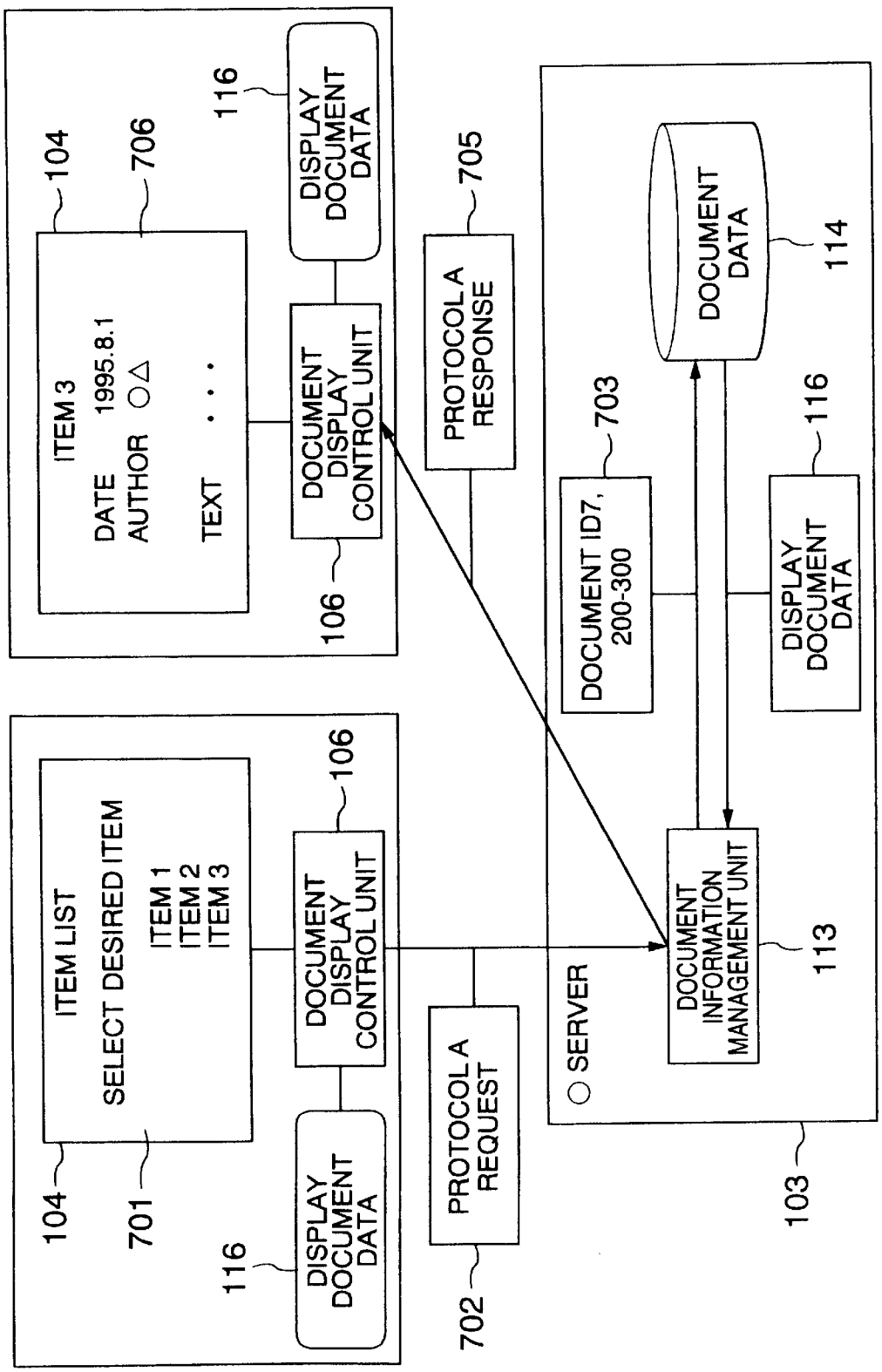

| INSTRUCTION | OPERATION |
|---|---|
| DISPLAY MENU | function1 |
| ACQUIRE DOCUMENT | function2 |
| REGISTER DOCUMENT | function1 |
| UPDATE DOCUMENT | function1 |

FIG.14A

| RETRIEVAL RESULT |
|---|
| NUMBER OF HITS : 3 |
| DOCUMENT 1<br>DOCUMENT 2<br>DOCUMENT 3 |

FIG.14B

RETRIEVAL RESULT  NUMBER OF HITS : 3  DOCUMENT 1 — 1401

| NUMBER<br>OF BYTES | RETRIEVAL RESULT | | | |
|---|---|---|---|---|
| DOCUMENT 2 | DOCUMENT 3 | | | |
| DOCUMENT 1 | PROTOCOL B | ○○ SERVER | DOCUMENT ID 5 | ENTIRE<br>DOCUMENT |
| DOCUMENT 2 | PROTOCOL C | — | DOCUMENT ID 8 | — |
| DOCUMENT 3 | PROTOCOL A | ○ SERVER | DOCUMENT ID 7 | 200-300 |

| ID | DOCUMENT<br>MANAGEMENT SERVER ID | DOCUMENT<br>ID | USER |
|---|---|---|---|
| 1 | 1 | 100 | user1 |
| 2 | 4 | 300 | user2 |
| 3 | 5 | doc1 | user3 |
| ... | | | |

NOTICE OF RESERVED
INFORMATION

THE FOLLOWING NEW
DOCUMENTS WERE
FOUND FOR "COMPUTERS
& NEW PRODUCTS"

DOCUMENT 1  '95.8.1
DOCUMENT 2  '95.8.2

FIG. 19B

1901 — NOTICE OF RESERVED INFORMATION   THE FOLLOWING
NEW DOCUMENTS WERE FOUND FOR "COMPUTERS & NEW PRODUCTS"
DOCUMENT 1  '95.8.1   DOCUMENT 2  '95.8.2

| NUMBER OF BYTES | | | | |
|---|---|---|---|---|
| DOCUMENT 1 | PROTOCOL A | ○ SERVER | DOCUMENT ID 5 | ENTIRE DOCUMENT |
| DOCUMENT 2 | PROTOCOL C | — | DOCUMENT ID 8 | — |

NOTICE OF RESERVED
INFORMATION

DOCUMENTS RELATING
TO "CARS" WERE NEWLY
FOUND

SERVER 1   3 ITEMS
SERVER 2   2 ITEMS

FIG. 19D

1911 — NOTICE OF RESERVED INFORMATION   FOLLOWING
SERVERS WERE NEWLY FOUND FOR "COMPUTERS & NEW PRODUCTS"
SERVER 1  3 ITEMS   SERVER 2  2 ITEMS

| NUMBER OF BYTES | | | |
|---|---|---|---|
| SERVER 1 | PROTOCOL A | address5 | MainMenu |
| SERVER 2 | PROTOCOL C | address4 | MainMenu |

1910, 1912, 1913, 1914, 1915

DOCUMENT INFORMATION COLLECTION METHOD AND DOCUMENT INFORMATION COLLECTION APPARATUS

BACKGROUND OF THE INVENTION

The present invention relates to a method for collecting document information through a communication network, and more particularly to document information collection method and document information collection apparatus which allow to automatically form a database from document information acquired from a plurality of information sources.

Many document management servers for electronically referring documents such as an on-line news service, an electronic bulletin board system and a document database have been known. Some of those systems may allow retrieval of a stored document but the retrieval is conducted for the entire data in the system. Accordingly, when a user wants to refer again a document which the user has referred in the past, it is necessary to retrieve it from the result of retrieval for the entire system or the user is required to explicitly register the document which he has referred in a database which he managed by himself. When the user utilizes a plurality of document management servers, the user must sequentially access the respective systems to conduct the retrieval because there is no means for retrieving in one pass from a plurality of systems having different document acquirement protocols or communication protocols.

As a method for determining a particular server in which a document of interest resides from a number of document management servers, it is known to provide a server directory which is a database for determining documents which each of the document management servers contains, as described in "Outlook of Next-generation Information Distribution System", Richard Maron Stein, NIKKEI BYTE, November 1991, pp. 320–331. However, the server directory disclosed therein can manage only information on the document management servers which communicate under a particular protocol. Further, the information on each document management server managed by the server directory is a document on which a manager of each document management server has described about features of the server and it is not always described from a view point of a retrieving user and it does not always properly express the document managed by each server.

Some of the document management servers have a function to previously register a retrieval condition and notify to the user when a new document which matches the condition is registered in the document management server. However, what is informed is only the newly arrived information on the document management server which has registered the retrieval condition, and even if newly arrived information on other document management server matches the retrieval condition, it is not informed. Further, in order to detect the newly arrived information on the document it is necessary to periodically access the document management server to execute the same retrieval or individually describe a program to periodically acquire the document.

Recently, the number of documents which are electronically accessible as well as the number of document management servers which provide documents are huge.

Even if a user wants to read again a document which the user has read before, it is difficult to remember a location of the document. Even if the user wants to save the document in his hand, he is unaware of which document will be required later and it is trouble-some to save all documents that the user reads. Some document servers do not have a retrieval function and in this case it is difficult to locate a desired document. Even with a server having a retrieval function, a retrieval result is huge depending on the retrieval condition and it is difficult to find a desired one from the retrieval result. Further, since the retrieval function differs from server to server, it is required to remember a server in which a particular document resides or access many document management servers.

It is therefore a first object of the present invention to provide document information collection method and document information collection apparatus which automatically and collectively store documents referred from various document management servers in a document database which managed by a user in order to allow the retrieval.

When a document which has not been referred before but newly matches a condition is to be retrieved and it is not known which document management server the document is to be retrieved from, it is necessary to access many document management servers. As described above, a problem is involved in the method of providing a server directory which is a database for the document management servers.

It is a second object of the present invention to provide document information collection method and document information collection apparatus which allows the detection of a particular document management server in which a document along a user's intent resides.

The document management servers and the documents in each sever are increasing day by day and even if a document management server or new document which may be a new information source of interest is involved, it is difficult to find it. It is particularly difficult to find the existence of a document management server which is a new information source. However, it is highly probable that a document or a document management server referred by other user who has a similar interest to that of the user includes document information of the user's interest and those information are effective in detecting a new document or information source.

It is a third object of the present invention to provide document information collection method and document information collection apparatus which allow the automatic detection of information of interest to a user from documents or document management servers newly found by other users.

SUMMARY OF THE INVENTION

In accordance with the present invention, document display means for issuing a document display request and request relay means for relaying the document display request, acquiring a document from a document management server in which the document is stored and storing the document in a database having document retrieval means are provided. The document display means, the document management server, the document database and the request relay means are connected through a communication network. The request relay means accepts document display requests from a plurality of document display means, acquires documents from a plurality of document management servers and collectively stores the acquired documents in the document database.

Further, interested item memory means for storing interested items of a user, information monitor means for monitoring a document to be registered in the document database and information on the document management server from which the document is acquired and information notify means for notifying information of document itself or information of the document management server to the user when the document which matches the interested item of the user is registered in the document database are provided. The information notify means may asynchronously notify the information to the user. The document display means sends the same document display request as that which is directly sent to the document management server to the request relay means. The request relay means sends the same document display request to the document management server, receives a response from the document management server, acquires the document and stores it in the document database. At the same time, the request relay means sends back the response received from the document management server to the document display means as it is. Thus, the user who issues the request through the document display means can structure the database of the documents which the user referred to without extra manpower of storing the documents in the document database. Since there is no change in the request or the response method, it is not necessary to modify the existing document management server and document display means.

The request relay means acquires documents from a plurality of document management servers having different document acquire protocols and stores them in the document database. Thus, it is possible to retrieve a document from a plurality of information sources on one document database.

The request relay means may be shared by a plurality of users. When the request relay means is used by the plurality of users, the information monitor means monitors the document database, and when a document which matches an interested item of a user, it notifies to the user the document or the information on the document management server in which the document is stored through the document notify means. Thus, the user may detect the existence of the document or the document management server which found by other use.

BRIEF DESCRIPTION OF THE DRAWINGS

FIG. 1 shows a configuration of a document information collection apparatus of the present invention, FIG. 2 shows a system configuration which utilizes the document information collection apparatus of the present invention, FIG. 3 shows a format of a document display data table, FIG. 4 shows a format of a server management data table, FIG. 5 shows a format of a document information data table, FIG. 6 shows a format of an interested item data table, FIG. 7 shows an operation of a document display client and a document management server in a prior art method, FIGS. 14A and 14B show format of retrieval result and display thereof, respectively, FIG. 16 shows a format of a document acquire request record table, FIGS. 19A–19D show types of message and displays thereof.

DESCRIPTION OF THE PREFERRED EMBODIMENTS

Figure 8A:
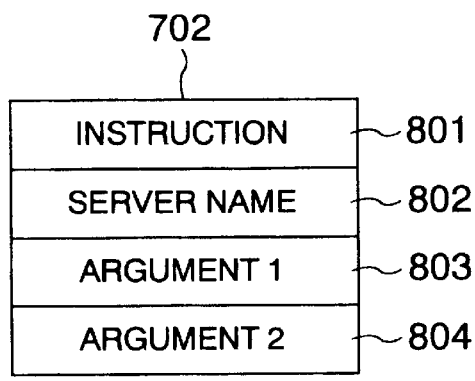
FIGS. 8A–8D show formats of request issued by the document display client to the document management server.

An embodiment of the present invention will be described with reference to the accompanying drawings.

FIG. 1 shows a configuration of a document information system including a document information collection apparatus of the present invention. Functions of respective units are now explained with reference to FIG. 1.

A document display client 101, a database server 102 and a document management server 103 are connected through a communication network 115.

The document display client 101 is a computer connected to the communication network 115 and it operates as a user terminal. The document display client 101 accepts a request from a user through an input device 105 such as keyboard or a pointing device including a mouse.

A document display control unit 106 displays guide information for the display of document or a document such as a document list menu to a display device 104 and it is client software for the document management server 103. The user inputs a request to the document display control unit 106 through the input device 105 to designate a document which the user wants to read. Display document data 116 is used to display a screen by the document display control unit 106 and it is data of the document per se or data for displaying a document list. The display document data 116 will be described in detail later with reference to FIG. 3. A database control unit 118 is client software for retrieving data from a document database 117 and registering data. A message control unit 107 controls a message asynchronously sent to the user even when the user does not operate the document display client 101 and it may use an electronic mail.

The document management server 103 stores documents, receives a request from a client through the communication network 115 and sends back a corresponding document to the client. The document management server 103 comprises a document information management unit 113 and document data 114. The document data 114 comprises documents and management information therefor. The document information management unit 113 manages the document data 114 and responds to a document acquire request from the document display control unit 106 on the document display client 101.

The database server 102 relays the request and the response between the document display client 101 and the document management server 103 and stores the document data in the database. Namely, the request relay server receives the request from the document display client 101, transfers the request to the document management server 103, receives the response from the document management server 103, and sends back the response to the document display client 101. If the response is document data, it is stored in the database.

A configuration of the database server 102 is shown below. A request relay unit 108 relays the request and the response between the document display client 101 and the document management server 103 based on the information of server management data 119.

A format of the server management data 119 is shown in FIG. 4. Numerals 410, 411, 412, 413 and 414 denote entries to the respective document management servers. Each entry comprises a document management server ID 400, a protocol 401, a server name 402, a location 403, an effective period 404 and additional information 405. The document management server ID 400 is an identifier for uniquely identifying each entry. The protocol 401 is data indicating a communication protocol used by the document management server. The server name 402 is data indicating the name of the document management server. In the example shown in FIG. 4, the document management servers which use a protocol A include "○ server", "Δ sever" and "x server", and the document management servers which use a protocol C include "○○ server". Depending on the protocol, the server name may not be required or the server may be uniquely determined. In such a case, the data in the server name 402 is not necessary. An example thereof is the document management server which uses the protocol C designated by 414. The effective period 404 is data indicating an effective period of data on the document database 117. The effective period is used when the document previously acquired from the document management server is to be reused. The document management server may be of a type in which the document once registered will never been modified or of a type in which the document is periodically updated and the lifetimes of the documents are versatile. When "−1" is designated by the effective period 404, it indicates the document management server of the type in which the document is never modified, and when a positive number is designated, it indicates that the document previously acquired may be considered valid until the expiration of the number of days indicated by the numeral. The numeral need not always be equal to an interval at which the document is actually updated by the document management server, but in this case the data of the document on the document management server may be different from the data of the document which the user acquires on the document display client 101. In order to avoid it, "0" may be designated for the effective period 404 so that when the document is acquired, the document management server is always accessed to acquire the latest document data. The additional information 405 is data for describing other necessary information, and the described data may differ depending from protocol to protocol of the document management server. In the example of FIG. 4, the protocol A describes the last access time to the document management server and the protocol B describes a log-in user name in accessing the sever as the additional information.

The document database 117 receives requests from the request relay unit 108 and the database control unit 118 and stores the document data and provides the retrieval function. The document database 117 comprises a database management unit 109 and document information data 110.

The document information data 110 is of a format shown in FIG. 5. Numerals 510, 511 and 512 denote entries for the respective documents. Each entry comprises an ID 501, a document management server ID 502, a document ID 503, a user 504, a date 505, an attribute 506 and a text 507. The ID 501 is an identifier for uniquely identifying each entry. The document management server ID 502 is data for identifying a document management server in which an original document is stored and it corresponds to data of item 400 in FIG. 4. The document ID 503 is data for indicating a document identifier on the document management server. When additional information such as location in the document is necessary, additional information may be added to the document ID 503. The user 504 is a user name of a user who requests the document. The user 504 may not be used depending on protocol. The data 505 indicates a date on which each entry is registered. The attribute 506 is data to describe other necessary information and the described data may differ from protocol to protocol of the document management server. For example, a title name or the number of characters may be described. The text 507 is text data of the document per se.

The documents stored in the document database 117 may be retrieved by using the function of the database management unit 109. As retrieval keys, any attribute information and classification information which are present in a table shown in FIG. 5 may be designated. When the document database 117 has a whole text retrieval function, the retrieval may be conducted by using any word included in the text. In the whole text retrieval function, when a condition may be designated by "A and B and C" which is a logical expression of words included in the document or a plurality of words may be designated as the condition and a correlation between the document and those words may be calculated and they are arranged in the ascending order of correlation.

An information monitor unit 111 monitors new information on the document database 117, and when a document relating to an item which the user is interested in is newly registered, it notifies it to the user through a message control unit 107. Interested item data 112 is data relating to the interested item of the user and an addressee of the message.

A format of the interested item data 112 is shown in FIG. 6. Numerals 610, 611, 612 and 613 denote entries for the interested items. Each entry comprises an ID 601, an execution date 602, notify means 603, an address 604, a frequency 605, a form of notification 606, a condition 607 and an object 608. The ID 601 is an identifier for uniquely identifying each entry. The execution date 602 is date on which the interested item was notified previously and it is updated each time the notification is executed. The notify means 603 is data indicating means for notifying the interested item. As the notify means, an electronic file or a specific file on the server may be designated. The address 604 designates an address of the electronic mail when the notify means 603 is the electronic mail, and a file name when the notify means 603 is the file. When the user wants to detect the interested item, he may review the content of the electronic mail or periodically refer the file in the server. The frequency 605 indicates a frequency to notify the data which matches the interested item. For example, the number of times of notification per predetermined period such as monthly or daily is designated. The notification format 606 indicates a massage format. As the format, a conventional text format or a format for a special program may be designated. The condition 607 designates the interested item of the user. For example, the entry 610 indicates the interest to "computers and new products". The object 608 designates the object of notification of the interested item. When the "document" is designated as the object 608, the document which matches the interested item is notified as the interested item data. The document management server in which the document which matches the interested item is notified as the interested item data.

The message control unit 107 exchanges messages with the message control unit on the document display client 101.

The document display client 101, the database server 102 and the document management server 103 may be located on the same computer or on separate computers. As for the document database 117, it may be located on one computer or it may be a distributed database across a plurality of computers.

The document display clients and the document management servers may comprise a plurality of units, respectively. In FIG. 2, numerals 201, 202, 203 and 204 denote document management servers which have individual document management functions. The document management server may be of one type or a plurality of types. In FIG. 2, numerals 201 and 202 denote document management servers which accept the document acquire requests based on the common protocol A, numeral 203 denotes a document management server which accepts the document acquire request based on the protocol B, and numeral 204 denotes a document management server which accepts the document acquire request based on the protocol C.

In FIG. 2, numerals 205, 206 and 207 denote document display clients. For the document display client 205, the user uses the document display client for the protocol A to refer the document of the document management server a 201. For the document display client 206, the user uses the document display client for the protocol A to refer the document of the document management server b 202. For the document display client 207, the user uses the document display client for the protocol C to refer the document of a document management server d 204.

Numeral 102 in FIG. 2 shows detail of the request relay unit 108 of the database server 102 of FIG. 1. The request relay unit 108 can relay a plurality of protocols. A protocol A relay unit 208 relays requests and responses between the document display client and the document management server by the protocol A. A protocol B relay unit 209 relays requests and responses between the document display client and the document management server by the protocol B. A protocol C relay unit 210 relays requests and responses between the document display client and the document management server by the protocol C. A document registration unit 211 receives document data from the respective protocol relay units and stores the document data in the document database 117. A document retrieval unit 212 retrieves data on the document database 117.

Detail of function of the respective units and a flow of an operation among the units are shown below.

First, referring to FIG. 7, an operation between the document display client 101 and the document management server 103 in a prior art method is described. Numeral 701 of FIG. 7 shows a display content of the display device 104 when it is connected to the "○ server" which is one of the document management servers. The document display control unit 106 has data as shown in FIG. 3 as the display document data 116. FIG. 3 shows data displaying a main screen when it is connected to the ○ server. In the present embodiment, the main screen is a document list menu in the ○ server. Numeral 300 in FIG. 3 indicates the number of bytes of data 301 of the display text displayed on the screen. Numerals 302, 303 and 304 describe information to transit from the main screen to a sub-screen or a screen of the document text.

For example, numeral 303 indicates that, when the display text data is displayed on the display device 104 for the document display control unit 106, the readiness to the transition to the item 2 may be notified to the user by underscoring the bytes 22–24, that is, the words "item 2" in the present embodiment, when it is displayed, and "enable the transition to the item 1 when the underscored portion is pointed by the input device 105" is commanded. At the same time, as the information to transit to the item 2, the information that the item 2 is the entire document indicated by the "document ID 10" of the document management server "Δ server" is described. Numeral 304 indicates that the item 3 is the bytes 200–300 of the document indicated by the "document ID 7" of the "○ server".

Figure 8B:
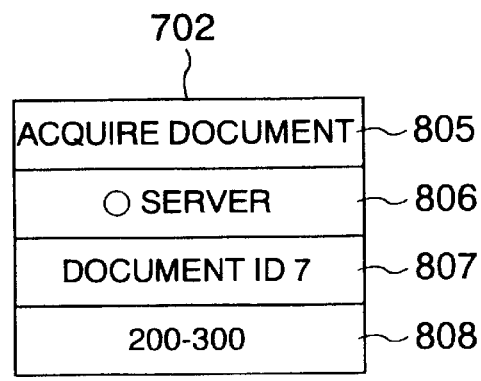

When the user points the portion of the "item 3" of 701 by the input device 105, the document display control unit 106 receives it as an acquire request of the item 3 and issues a request 702 to the ○ server. Since the ○ sever is the sever corresponding to the protocol A, the request is of a format which is compatible to the protocol A. FIGS. 8A–8D show examples of the request 702. FIG. 8A shows a general form of request corresponding to the protocol A and FIG. 8B shows a specific example for the ○ sever. The request 702 corresponding to the protocol A comprises a command 801, a sever name 802, an argument 1 (803) and an argument 2 (804). The command 801 designates an operation to the server such as "acquire document", "update document" or "display sub-menu". In the present embodiment, the "acquire document" 805 is designated. The server name 802 designates a request destination server of the document management servers corresponding to the protocol A. In the present embodiment, the "○ server" 806 is designated. The argument 1 (803) designates the document ID. In the present embodiment, the "document ID 7" 807 is designated. The argument 2 (804) designates a portion of the document to be acquired. In the present embodiment, the "bytes 200–300" 808 is designated. The "entire document" may be designated.

Figure 8C:
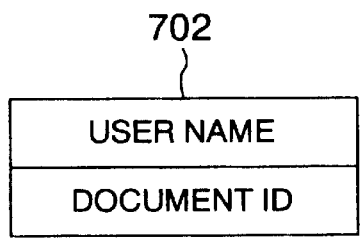
Figure 8D:
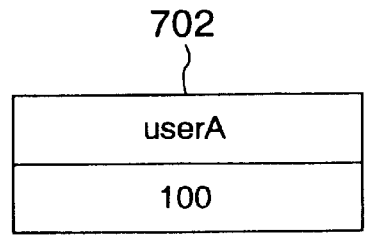

The above request is of the form compatible to the protocol A. A general form of another request 702 corresponding to the protocol C is shown in FIG. 8C, and a specific example thereof is shown in FIG. 8D. In the request 702 corresponding to the protocol C, only the user name and the document ID are designated. In the protocol C, the sever is fixed and the location in the document cannot be designated.

Figure 9A:
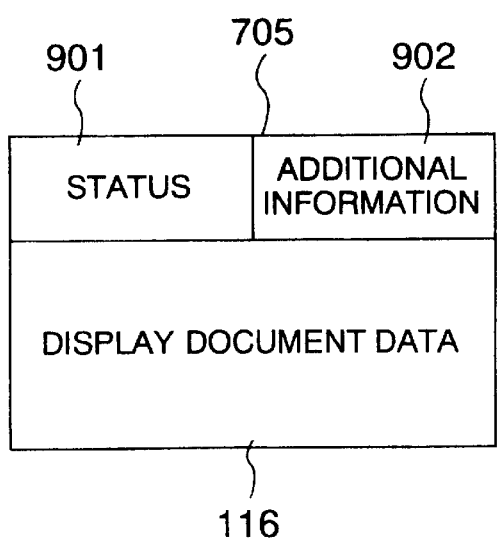
FIGS. 9A and 9B show format of response sent back from the document management server to the document display client.
Figure 9B:
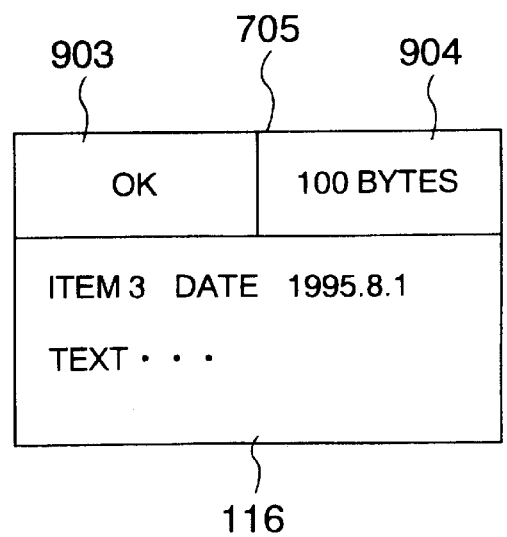

The document information management unit 113 of the ○ server analyzes the request 702 to extract the requested data. In the present embodiment, the "200–300 bytes of document ID 7" 703 is requested. Then, the document information control unit 113 extracts the display document data 116 corresponding to the request from the document data 114 and sends back a response 705 corresponding to the protocol A to the requester. An example of the response 705 corresponding to the protocol A is shown in FIGS. 9A and 9B. FIG. 9A shows a general form of the request corresponding to the protocol A and FIG. 9B shows a specific example thereof. The response corresponding to the protocol A comprises a status 901, additional information 902 and display document data 116. The status indicates whether the request succeeded or failed. In the present embodiment, "OK" 903 indicating the success is sent back. The additional information indicates a size of the display document data 116 in the present embodiment, and "100 bytes" 904 is sent back. The display document data is data used when information is displayed on the display device 104 by the document display control unit 108. In the present embodiment, information of bytes 200–300 of the "item 3" is contained. The format of the response 705 differs from protocol to protocol as it is for the request 702. Numeral 706 of FIG. 7 shows a status of the display device 104 after the document display control unit 106 has received the response 705 corresponding to the request 702.

In this manner, in the prior art method, the request and the response are exchanged by the direct communication of the document display client 101 and the document management server 103.

Figure 10:
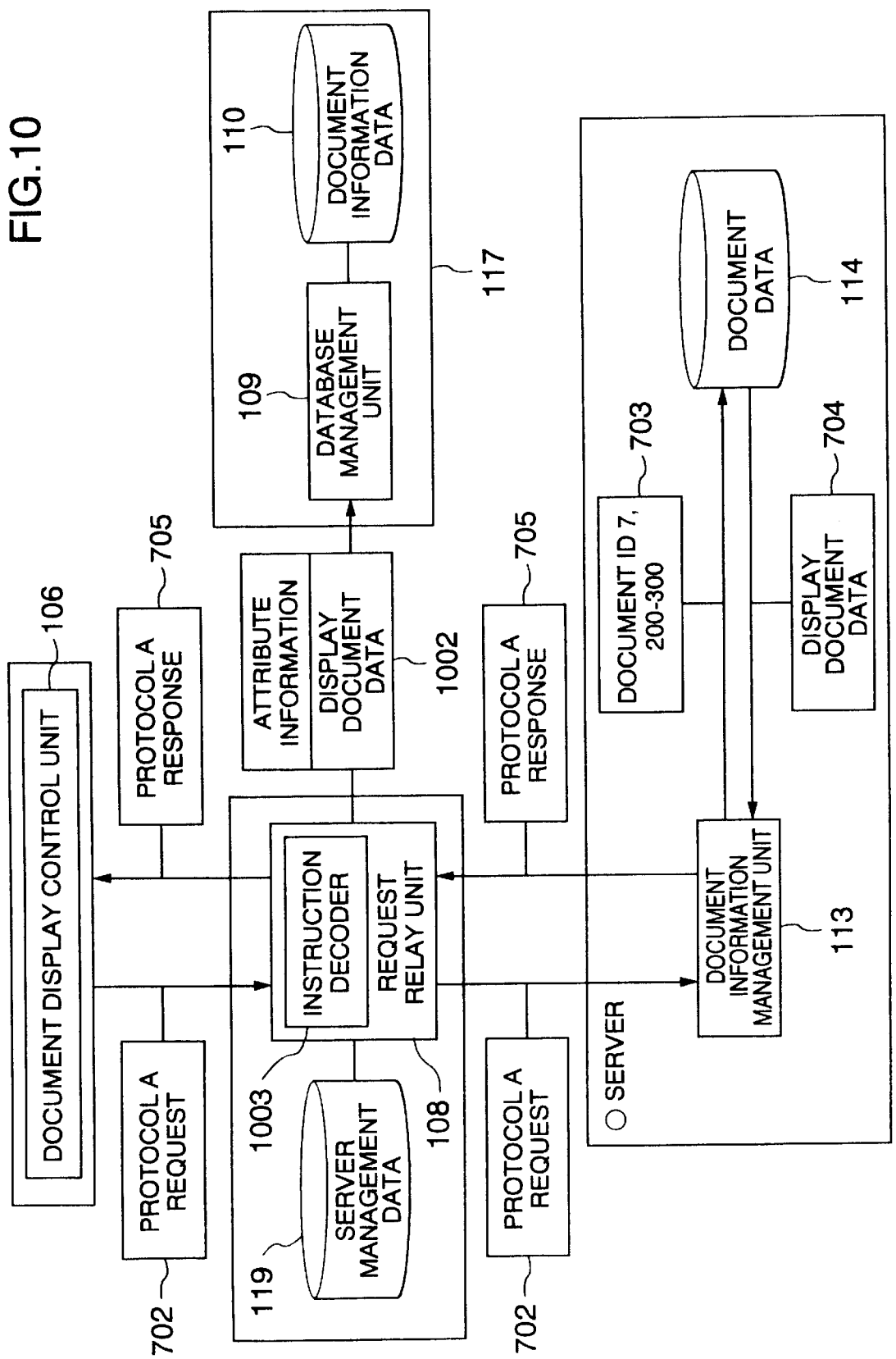
FIG. 10 shows an operation of a request relay unit.

An operation when the request relay unit 108 in accordance with the present invention is used is now explained. As shown in FIG. 10, the request relay unit 108 relays the request and the response between the document display client 101 and the document management server 103. In the present embodiment, the document display client 101 and the document management server 103 communicates by using the protocol A and the request relay unit 108 also conducts the operation corresponding to the protocol A. Namely, the protocol A relay unit 208 in the request relay unit 108 of FIG. 2 is used.

Figure 11:
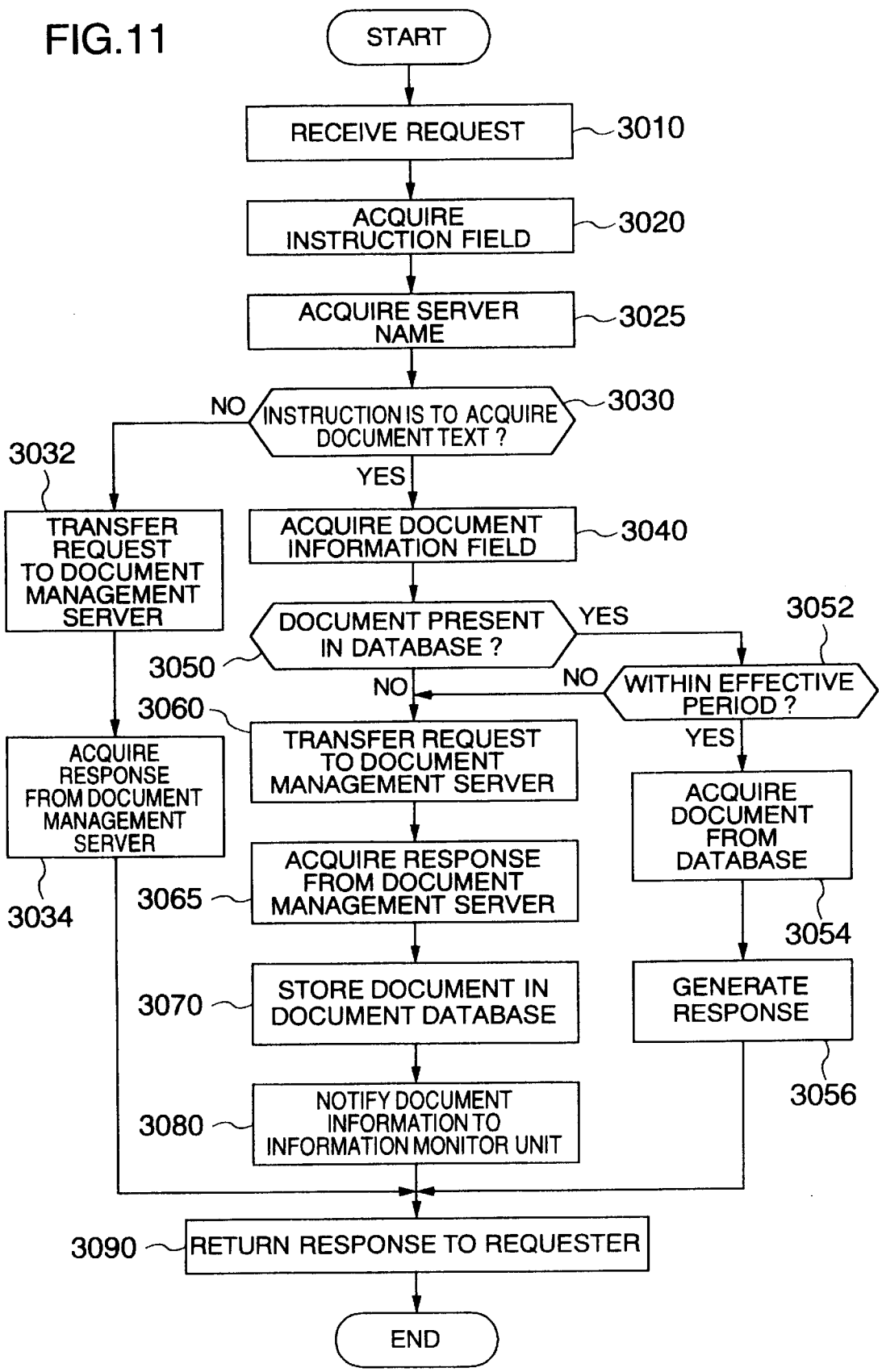
FIG. 11 is an operation flow chart of the request relay unit.

A flow of an operation of the request relay unit 108 is now explained with reference to FIGS. 10 and 11. FIG. 10 shows a flow of data around the request relay unit 108 and FIG. 11 shows steps of the operation of the request relay unit.

[Step 3010] The request 702 by the protocol A is received from the document display control unit 106.

[Step 3020] An instruction decoder 1003 (FIG. 10) of the request relay unit 108 extracts an instruction field 801 (FIGS. 8A–8D) from the request 702.

[Step 3025] The instruction decoder 1003 extracts a server name 802 (FIGS. 8A–8D) from the request 702.

Figures 12, 13:
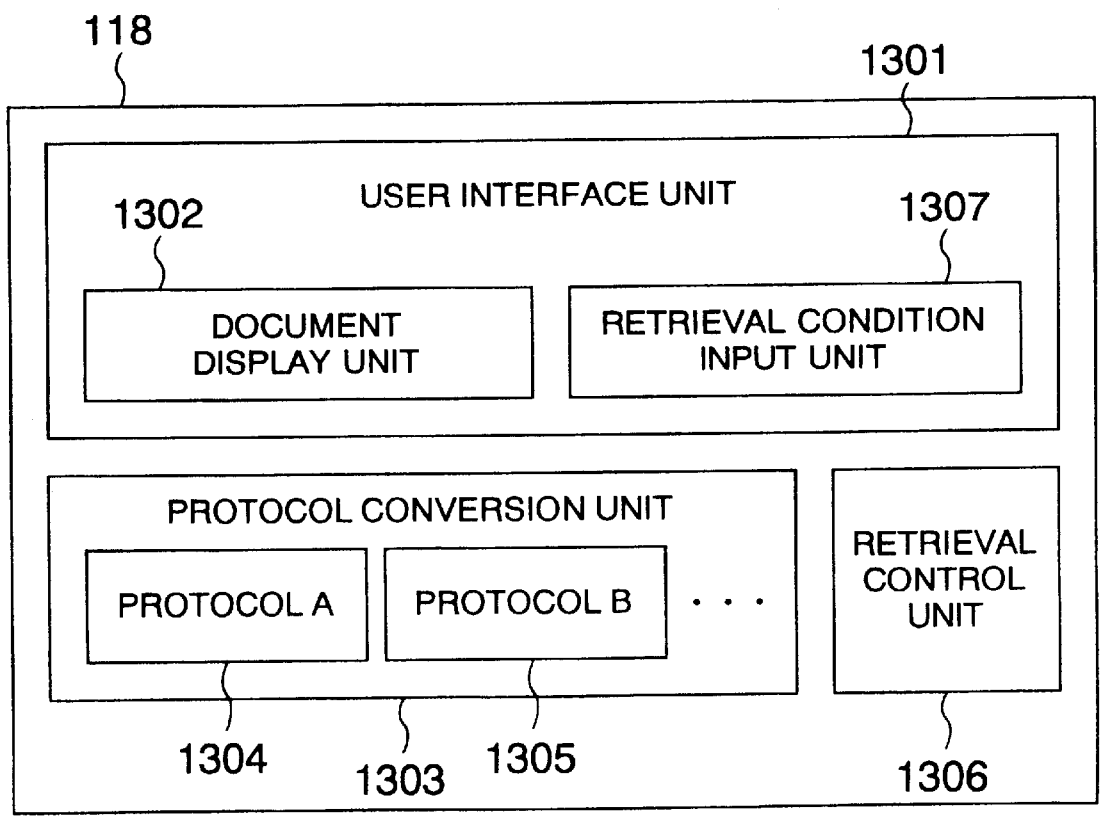
FIG. 12 shows types of request issued by the document display client to the document management server and an operation thereof.
FIG. 13 shows a configuration of a database control unit.

[Step 3030] Whether the data in the instruction field 801 is "acquire data" or not is determined. The instruction of request by the protocol A includes "display menu", "acquire document" and "update document" as shown in FIG. 12. The request relay unit 108 stores functions describing processes corresponding to the respective instructions. In the example shown in FIG. 12, "function 2" is executed for the "acquire document" instruction and "function 1" is executed for other instructions. In accordance with the respective functions, the process proceeds to a step 3040 if the instruction is the "acquire document" and to a step 3032 for other case.

[Step 3032] The request relay unit 108 transfers the request 702 to the "○ server" which is the document management server corresponding to the server name 802. The request relay unit 108 uses the server management data 119 to communicate with the ○ server. In the present embodiment, the entry 410 shown in FIG. 4 corresponds thereto and it may be connected to the document management server on the "address 1". When the ○ server receives the request, it operates in the same manner as that of the prior art shown in FIG. 7 to generate a response.

[Step 3034] The request relay unit receives the response 705 by the protocol A from the "○ server" and the process proceeds to a step 3090.

[Step 3040] The instruction decoder 1003 extracts the document information field, that is, the argument 1 and the argument 2 from the request 702. The argument 1 and the argument 2 correspond to 803 and 804 shown in FIG. 8 and in the present embodiment, the "document ID 7" 807 and "200–300" 808 correspond thereto, respectively.

[Step 3050] Whether the document data corresponding to the document information field acquired in the step 3040 is managed by the document database 117 in the database server 102 or not is determined. Specifically, each entry of the document information data 110 shown in FIG. 5 is examined through the database management unit 109, and whether an entry for the bytes "200–300" of the "document ID 7" on the "○ server" of the document management server using the "protocol A" is present or not is determined, and if it is present, the process proceeds to a step 3052, and if it is not present, the process proceeds to a step 3060. Since it is not present in the present embodiment, the process proceeds to the step 3060.

[Step 3052] Whether the document data present in the document database is within the effective period or not is determined. Specifically, the date on which the document data has been registered (505 in FIG. 5) is examined, a difference from the current date is calculated and whether the document data is within the number of days of the effective period shown by 404 in FIG. 4. If it is within the effective period, the process proceeds to a step 3054, and if it is not within the effective period, the process proceeds to a step 3060.

[Step 3054] Document data relating to the requested document (those corresponding to the respective entries of FIG. 5) is acquired from the document information data 110 in the document database 117 through the database management unit 109.

[Step 3056] The response corresponding to the protocol A is generated from the document data and the process proceeds to a step 3090.

[Step 3060] The request received in the step 3010 is transferred to the server acquired in the step 3025. In the present embodiment, it is transferred to the "○ server" on the "address 1" by using the "protocol A". When the "○ server" receives the request, it operates in the same manner as that explained in the prior art method shown in FIG. 7 to generate the response.

[Step 3065] The response 705 is acquired from the document management server. [Step 3070] Information 1002 (FIG. 10) comprising the document attribute information (902 in FIG. 9B) and the display document data (116 in FIG. 9B) is extracted from the response 705 and it is registered as a new entry of the document database through the database management unit 109.

[Step 3080] The registration of the new document in the document database 117 is notified to the information monitor unit.

[Step 3090] The response 705 is returned to the document display control unit.

In the manner described above, the document which the user referred to on the document display client 101 can be automatically stored in the document database 117 without special registration operation.

Further, since there is no change in the request and the response for the document display client 101 and the document management server 103, the same document display client may be connected to the document management server through the request relay unit, and when the document is not stored in the database, it may be directly connected to the document management server. Further, the document management system of the existing client-server configuration may be readily built in the document information collection apparatus of the present invention. When the document management system of the client-server configuration is newly constructed, the document information collection apparatus of the present invention may be built in if the interfaces of the request and the response are defined so that the sever which is the source of collection of the document information can be readily expanded.

When the document requested by the user is stored in the document database 117 and it is within the effective period, the document data stored in the document database 117 may be returned. Thus, the access to the document database 117 is fast and the acquire time of the document may be shortened when the access to the document management server 103 takes a long time.

The document data registered in the document database 117 in the manner described above can be retrieved through the database control unit 118 on the document display client 101. The database control unit 118 may execute only the retrieval and the reference to the retrieval result may be conducted by using the document display control units 106 corresponding to the respective protocols or the database control unit 118 may execute the retrieval and refer all document data.

A configuration when the database control unit 118 has both functions of the execution of retrieval and the reference to the document data is shown in FIG. 13. Numeral 1301 demotes a user interface unit which conducts the acceptance of the request from the user and the display of the information. The user interface unit 1301 comprises a retrieval condition input unit 1307 for inputting a retrieval condition of the document data on the document database 117 and a document display device 1302 for displaying the retrieval result and the document which matches the retrieval condition. The retrieval condition inputted through the retrieval condition input unit 1307 is sent to the database management unit 109 of the document database 117 through the retrieval control unit 1306, the retrieval is conducted and the result is returned to the retrieval control unit 1306. The retrieval result is displayed to the user through the document display device 1302.

FIG. 14A shows display of a list of the retrieval result. In the present example, there are three documents, "document 1", "document 2" and "document 3" which match the retrieval condition. As described above, the data of documents at various locations on the communication network 115 utilizing various protocols are stored in the document database 117. Thus, the document which is the retrieval result may have been acquired from the document management servers corresponding to various protocols. FIG. 14B shows data of the retrieval result returned from the database management unit 109 to the retrieval control unit 1306. In the example of FIG. 14B, the "document 1" is the entire document of the document designated by the "document ID 5" of the "oo server" corresponding to the "protocol B", the "document 2" is the document designated by the "document ID 8" of the document management server corresponding to the "protocol C", and the "document 3" is the bytes "200–300" of the document designated by the "document ID 7" of the "o server" corresponding to the "protocol A". The document display device 1302 receives the data shown in FIG. 14B and displays as shown in FIG. 14A.

A protocol conversion unit 1303 displays the data corresponding to various protocols on the document display device 1302. The protocol conversion unit 1303 comprises units for conducting processes corresponding to the respective protocols. Numeral 1304 conducts a process when a document on the document management server corresponding to the protocol A is requested, and numeral 1305 conducts a process when a document on the document management server corresponding to the protocol B is requested. For example, when the "document 3" 1402 of FIG. 14B is requested, the document data of the "document 3" is received from the database management unit 109 and it is displayed on the document display unit 1302 through the protocol A conversion unit 1304.

The database control unit 118 may share the function of the document display control unit 106 of FIG. 1. In this case, the database control unit 118 may conduct the reference to the documents on the document management server 103 as well as the retrieval and the reference of the documents on the document database 117.

Since the document data on the document database 117 can be retrieved, when the user can retrieve the document which the user has previously referred to, and when the request relay unit 108 is shared by a plurality of users, the user may retrieve a necessary document from the document which other user has referred to. Further, when there area plurality of document management servers which are information sources, the documents on the plurality of document management servers may be retrieved in one run.

The object to be retrieved need not be the document but it may be a document management server. In this case, the retrieval is executed with a certain retrieval condition, and if a matching document is present, the information of the document management server (the information of FIG. 4 corresponding to 502 of FIG. 5) instead of the document name and the number of documents found in each document management server are displayed in the retrieval result list. In this manner, the document management server which is the information source holding the document which the user wants can be detected.

Figure 15:
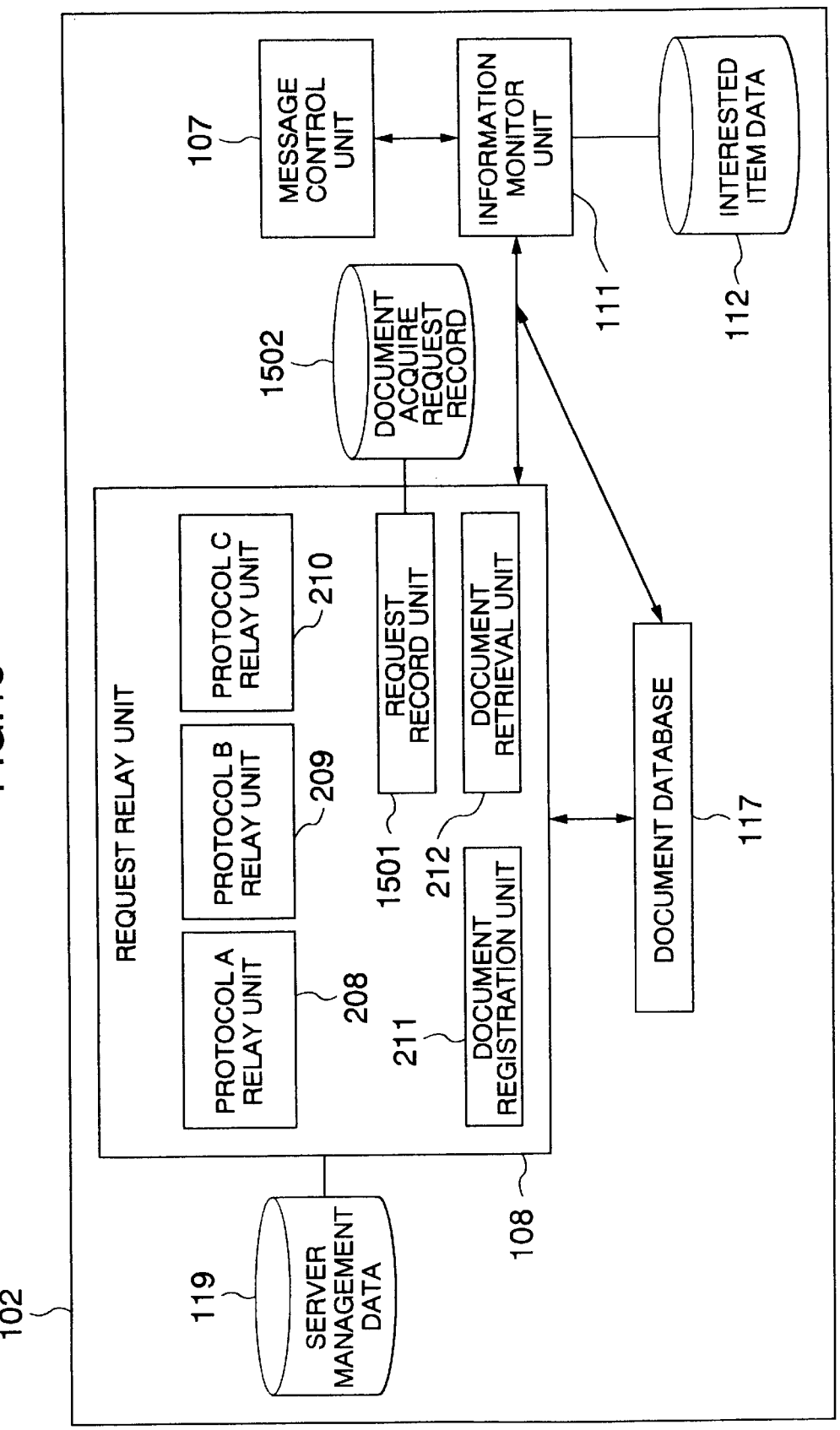
FIG. 15 shows another configuration of the request relay unit.

In the present embodiment, when the request relay unit 108 accepts the document acquire request from the document display client 101, it acquires the document from the document management server 103 and returns it to the document display client 101 and stores it in the document database 117. Alternatively, the storing of the documents in the document database 117 amy be collectively conducted at a later time. A configuration of the database server 102 when this method is adopted is shown in FIG. 15. The request relay unit 108 comprises a request record unit 1501 for recording the document acquire request and manages a document acquire request record 1502. When the request relay unit 108 accepts the document acquire request from the document display client 101, it acquires the document from the document management server 103 and returns it to the document display client 101, and the request record unit 1501 adds the document acquire request to the document acquire request record 1502.

A data format of the document acquire request record is shown in FIG. 16. Each entry of the document acquire request record comprises an ID 1601, a document management server ID 1602, document ID 1603 and a user 1604.

The ID 1601 is an identifier for uniquely identifying each entry. The document management server ID 1602 is data for identifying the document management server in which the original document is stored and it corresponds to the data of item 400 of FIG. 4. The document ID 1603 is data indicating a document identifier on the document management server. When additional information such as a position in the document is needed, additional information is added to the document ID 1603. The user 1604 is a user name of the user who requested the document. The user 1604 may not be used depending on the protocol.

The request relay unit 108 periodically refers the document acquire request record 1502, extracts the information of each entry, acquires the corresponding document from the corresponding document management server 103 and stores it in the document database 117. Then, the updating of the document database 117 is notified to the information monitor unit 111. At the same time, the document which has newly been added may be notified.

When the request relay unit is used by a plurality of users, the documents on various document management servers accessed by various uses are stored in the document database 117. In accordance with the present invention, each user may detect the information on the documents and the document management servers accessed by other users who share the request relay unit.

The information monitor unit 111 monitors new information on the document database 117, and when a document which matches the interested item of the user is registered, it is notified to the user. This operation is described below.

The start the operation of the information monitor unit may be triggered by setting a timer to start it at a predetermine interval or starting the operation when the updating of the document database 117 is notified from the request relay unit 108.

Figure 17:
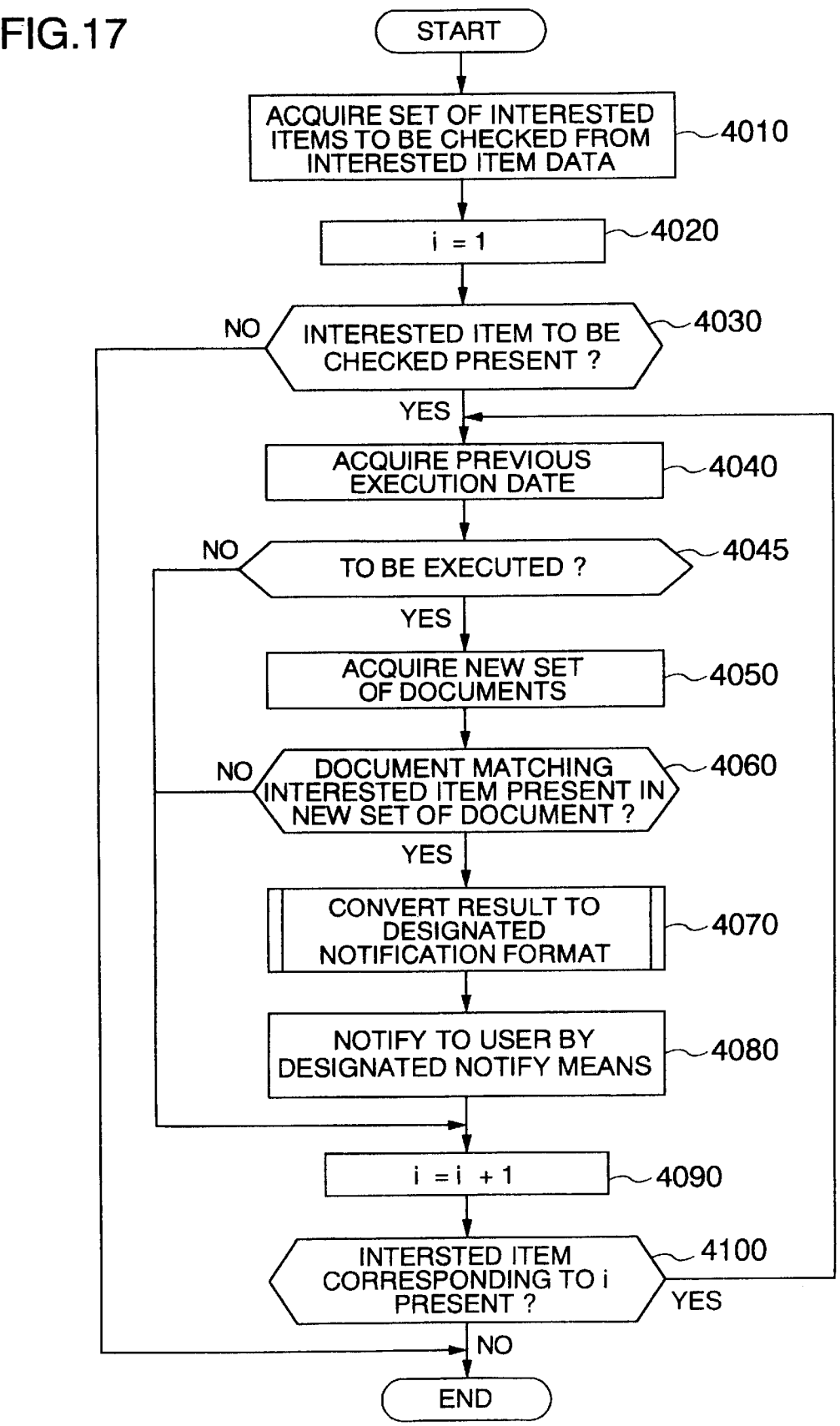
FIG. 17 shows an operation flow chart of an information monitor unit.

Referring to FIG. 17, an operation when the information monitor unit 111 is started is explained in detail.

[Step 4010] The interested item data 112 is accessed to acquire a set of data of the interested items as shown in Fog. 6.

[Step 4020] The counter i is set to "1".

[Step 4030] The interested item data acquired in the step 4010 is checked to determine whether the interested item is registered or not. If the interested item is registered, the process proceeds to a step 4035, and if it is not registered, the process is terminated.

[Step 4040] The previous execution date 602 and the frequency 605 of the interested item of the ID 601 corresponding to the counter i are acquired. The subsequent steps up to a step 4080 conduct the process for the interested item corresponding to the counter i.

[Step 4045] Whether the validation on the interested item corresponding to the counter i is to be conducted or not is determined based on the current date and the execution data 601 and the frequency 605 acquired in the step 4040. For example, when the current date is 95.8.2, the entry 610 indicates the frequency of once a month and it is not executed. The entries 611 and 612 indicate once a day and they are executed. When the validation of the interested item is to be conducted, the process proceeds to a step 4050, and when it is not to be conducted, the process proceeds to a step 4090.

[Step 4050] A set of documents registered on the document database 117 after the previous execution date 602 are acquired through the database management unit 109.

[Step 4060] The document which matches the condition 607 designated for the interested item is retrieved from the set of documents acquired in the step 4050 through the database management unit 109.

[Step 4070] The result of the retrieval conducted in the step 4060 is converted to a designated notification form. This step will be described later in detail with reference to FIG. 18.

[Step 4080] The result prepared in the step 4070 is notified to a designated address 604 by designated notify means 603.

[Step 4090] The counter i is incremented by one.

[Step 4100] Whether the interested item of the ID 601 corresponding to the counter i is present in the interested item data 112 or not is determined, and if it is present, the process proceeds to a step 4040, and if it is not present, the process is terminated.

Figure 18:
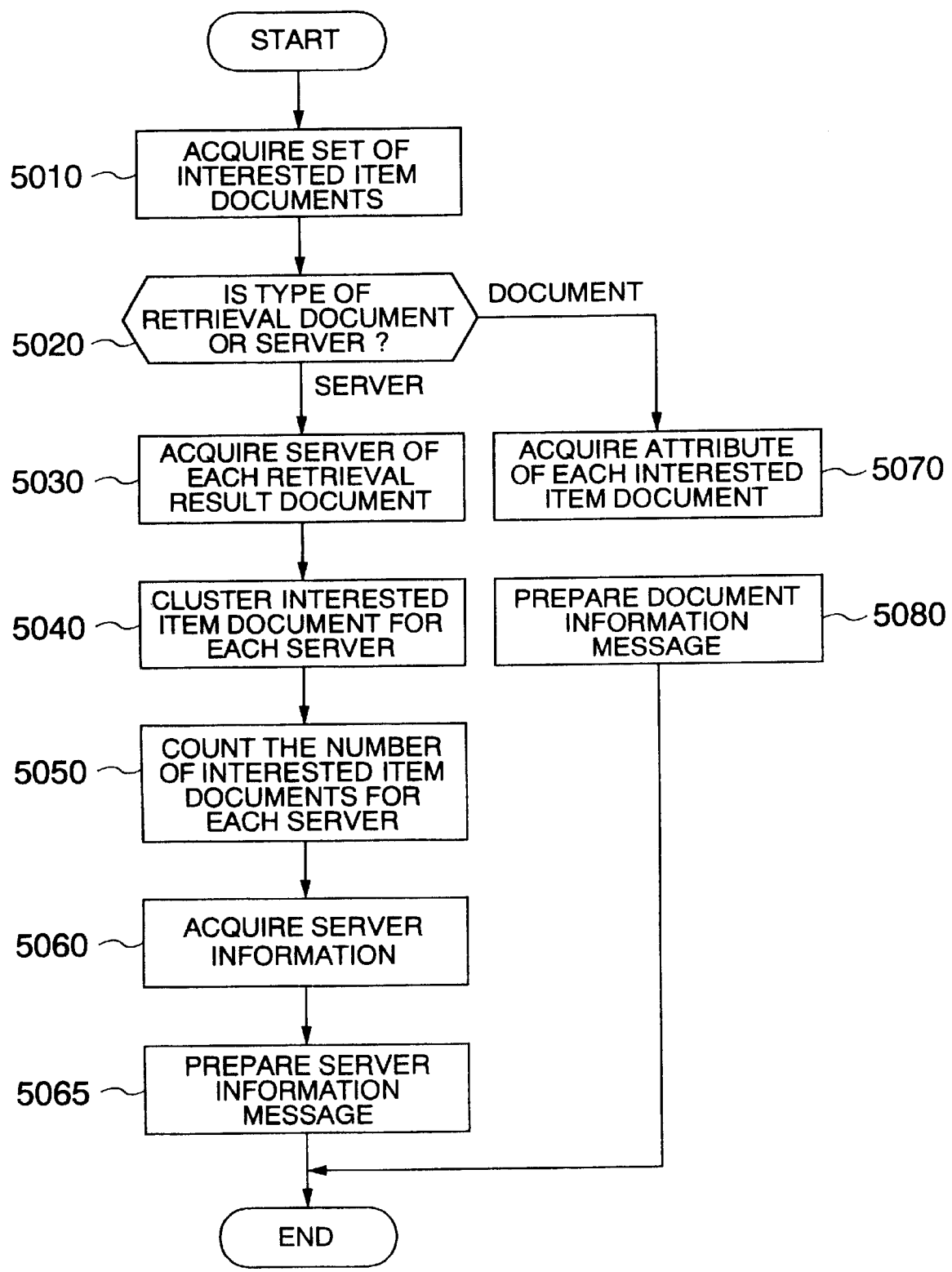
FIG. 18 shows a flow chart for message preparation.

Referring to FIG. 18, the step 4070 is explained in detail.

[Step 5010] A set of documents of the result of the retrieval conducted in the step 4060 is acquired.

[Step 5020] Whether the object 608 to be retrieved which is designated as the interested item is the "document" or the "server" is determined. If it is the "server", the process proceeds to a step 5030, and if it is the "document", the process proceeds to a step 5070.

[Step 5030] The document management server IDs 502 (FIG. 5) of the respective documents of the set of documents acquired in the step 5010 are acquired.

[Step 5040] The set of documents acquired in the step 5010 are clusterd for each of the document management server IDs acquired in the step 5030 to prepare subsets.

[Step 5050] The numbers of elements of the subsets clustered for each of the document management server IDs in the step 5040 are counted.

[Step 5060] The information on the document management servers corresponding to the document management server IDs are acquired from the server management data 119 (FIG. 4).

[Step 5065] The message on the document management server information which is the retrieval result is prepared in the format designated by the interested item notification form 606.

FIG. 19D shows an example of the message prepared in the step 5065 in the format used by the database control unit 118 as described with reference to FIG. 13. The message comprises the number of bytes 1910 of the message text, the message text 1911 and server information of the document management server which is the retrieval result. As many server information as the number of document management servers which hold the interested items are present. In the example of FIG. 19D, two information for the "server 1" and the "server 2" are present. The server information comprises information necessary for the database control unit 110 to access the document management server, a server name 1912, a protocol used 1913, a location 1914 and additional information 1915. FIG. 19C shows a manner of display of the message to the user by the database control unit 118. Since the number of elements of the set of documents for each document management server ID is counted in the step 5040, the number of documents which match the interested item found in each document management server may be displayed so that it may be used as a degree of correlation between the documents held in each document management server and the interested item of the user. When the user designates the "server 2" through the input device 105, the database control unit accesses the "Main Menu" 1915 of the "server 2".

[Step 5070] The attribute of each document of the set of documents acquired in the step 5010 is acquired from the document information data 110 (FIG. 5) through the database management unit 109.

[Step 5080] The message on the document management information which is the retrieval result is prepared in the format designated by the notification format 606 of the interested item.

FIG. 19B shows an example of the message prepared in the step 5080 in the format used by the database control unit 118 as described with reference to FIG. 13. The message comprises the number of bytes 1900 of a message text, the message text 1901 and document information of the document which is the retrieval result. As many document information as the number of elements in the set of documents acquired in the step 5010 are present. In the example of FIG. 19B, two information for the "document 1" and the "document 2" are present. The document information comprises information necessary for the database control unit 18 to display the document, a document name 1902, a protocol used 1903, a server name 1904, a document ID 1904 and additional information 1905. FIG. 19A shows a manner of display of the message to the user by the database control unit 118. When the user designates the "document 2" through the input device 105, the database control unit acquires the document through the request relay unit 108 and displays it.

When the notify means 603 is an electronic mail and the format designated by the notification format 606 is the format as shown in FIG. 3 which can be handled by the database control unit 118 as explained with reference to FIG. 1, the retrieval result may be referred by the database control unit 118 and the document text may be directly acquired from the screen of the retrieval result so that the operation from the reception of the message to the reference of the document text can be smoothly conducted.

In this manner, the user can automatically detect the documents which match the previously registered interested item and the document management servers in which those documents reside.

In accordance with the document information collection method and the document information collection apparatus of the present invention, the document referred can be automatically stored in the document database. When a document of interest to the user or a document management server in which the document of interest resides occurs, the user may receive the notification of the information thereof.

In accordance with the present invention, other document which refers the document designated by the user as a reference can be retrieved so that the retrieval of the latest reference which could not be attained in the prior art reference document retrieval method is attained.

What is claimed is:

1. A method of controlling a relaying server in a document information collection system having a document management server which collects documents therein, a terminal which allows a user to retrieve a document from said document management server and a relaying server which relays a document transferred between said document management server and said terminal, the method comprising the steps of: holding (a) delivery information having an item of information set therein which is used to see if the document is one which a user desires the delivery thereof, (b) a notification condition used to decide whether notification to user takes place or not, and (c) said item of interest information set in the delivery information, said (a), (b) and (c) being held in association with each other;

holding necessary information required to receive said transferred document, determine to see if said document corresponds to said item of information set in advance and transfer said document when said document corresponds to said item of information; and deciding whether said notification condition set is met and delivering said document to the user based on said delivery information when said notification condition is met.

2. A method according to claim 1 further comprising the steps of:

transferring a document display request to the document management server; and returning the document and the item of information to said document management server as a reply to the document display request.

3. A method according to claim 1, wherein said relaying server relays a request to a plurality of document management servers using the same protocol and a document display request to a plurality of document management servers using different protocols.

4. A document information collection apparatus comprising:

document display means connected through a communication network;

a document management server for enabling the acquisition of a document by using a predetermined document acquire process;

request relay means for accepting a document acquire request by the document acquire process from said document display means, transferring the document acquire request to said document management server to acquire the document and sending back the document to said document display means; and a document database for storing the document in response to the request from said request relay means.

5. A document information collection apparatus according to claim 4 wherein said request relay means accepts requests from a plurality of different users and a plurality of different terminals and requests by a plurality of different document acquire processes, acquires documents from the document management servers corresponding to the respective document acquire processes and stores the documents in the same document database.

6. A document information collection apparatus according to claim 4 wherein said message comprises attribute information of the document, document management server information necessary to acquire a text of the document and document identifier information and is displayed on said document display means, and when the text of each document is to be acquired, it is acquired from said document display means through said request relay means.

7. A document information collection apparatus according to claim 4 wherein a unit of retrieval result by said retrieval means is document management server information in which the document matching a retrieval condition is stored.

8. A document information collection apparatus according to claim 7 further comprising:

correlation evaluation means for evaluating a correlation between the document and the retrieval condition; and means for calculating the correlation for each document management server.

9. A document information collection apparatus according to claim 4 further comprising:

interested item memory means for storing a set of user name, an interested item and a notification address;

information monitor means for monitoring a document newly stored in said document database to determine whether a document which matches the interested item is registered or not; and message notify means for sending a message describing the information of the document when the document which matches the interested item is registered, to the notification address to notify the user.

10. A document information collection apparatus according to claim 9 wherein said message notify means is an electronic mail.

11. A document information collection apparatus according to claim 9 wherein a unit of the interested item is document management server information in which a document matching the retrieval condition is stored.

12. In a document information collection system having a document managing apparatus which collects documents therein and a terminal to allow a user to retrieve a document from said document managing apparatus, a relaying apparatus to relay a document which is transferred between said document managing apparatus and said terminal, said relaying apparatus comprising:

memory means for storing: (a) delivery information having an item of interest information set therein which is used to see if the document is one which a user desires to be delivered and (b) a notification condition used to decide whether notification to user takes place or not, both (a) and (b) being stored in said memory means in association with each other, said memory means further storing information necessary for receiving said transferred document, determining to see if said document corresponds to said item of interest information set in advance and transferring said document when said document corresponds to said item of interest information; and delivery means for deciding whether said notification condition is met and delivering said document to the user based on said delivery information when said notification condition is met.

13. A document information collection system according to claim 12, wherein said relaying apparatus accepts requests from a plurality of different users and a plurality of different terminals, and acquires, by a plurality of different document acquire processes, documents from the document management servers corresponding to the respective document acquire processes and stores the documents in the same document database.

14. A document information collection system according to claim 12, further comprising:

retrieval means including at least one of attribute retrieval means for retrieving an attribute of each document and document classification means for classifying the document in accordance with a predetermined rule, wherein a desired document is retrieved from said database using said retrieval means.

15. A document information collection system according to claim 14, wherein said message comprises attribute information of the document, document managing apparatus information necessary to acquire a text of the document and document identifier information and is displayed on said terminal, and when the text of each document is to be acquired, it is acquired from said terminal through said relaying apparatus.

16. A document information collection system according to claim 14, wherein a unit of retrieval result by said retrieval means is document managing apparatus information in which the document matching a retrieval condition is stored.

17. A document information collection system according to claim 16, further comprising:

correlation evaluation means for evaluating a correlation between the document and the retrieval condition; and means for calculating the correlation for each document managing apparatus.

18. A document information collection system according to claim 12, further comprising:

interested item memory means for storing a set of user name, an interested item and a notification address;

information monitor means for monitoring a document newly stored in said document database to determine whether a document which matches the interested item is registered or not; and message notify means for sending a message describing the information of the document when the document which matches the interested item is registered, to the notification address to notify the user.

19. A document information collection system according to claim 18, wherein said message notify means is an electronic mail.

20. A document information collection system according to claim 18, wherein a unit of the interested item is document managing apparatus information in which a document matching the retrieval condition is stored.

* * * * *